United States Patent [19]

Kawabata et al.

[11] Patent Number: 5,590,279
[45] Date of Patent: Dec. 31, 1996

[54] MEMORY DATA COPYING APPARATUS

[75] Inventors: Hiromi Kawabata; Yutaka Takeda, both of Tokyo, Japan

[73] Assignee: NEC Corporation, Tokyo, Japan

[21] Appl. No.: 616,938

[22] Filed: Mar. 18, 1996

Related U.S. Application Data

[63] Continuation of Ser. No. 111,405, Aug. 25, 1993, abandoned.

[30] Foreign Application Priority Data

Aug. 31, 1992 [JP] Japan ................... 4-231087

[51] Int. Cl.$^6$ ........................................ G06F 11/00
[52] U.S. Cl. ...................................... 395/185.06
[58] Field of Search ................... 395/185.06, 437, 395/438, 483, 200.01, 200.08, 200.13, 823, 824, 872, 875; 371/2.2, 40.1, 51.1; 364/238, 265, 265.3

[56] References Cited

U.S. PATENT DOCUMENTS

| | | | |
|---|---|---|---|
| 4,354,225 | 10/1982 | Frieder et al. | 364/200 |
| 4,400,778 | 8/1983 | Vivian et al. | 364/200 |
| 4,491,916 | 1/1985 | Vallhonrat | 364/200 |
| 4,516,199 | 5/1985 | Frieder et al. | 364/200 |
| 4,527,237 | 7/1985 | Frieder et al. | 364/200 |
| 5,113,418 | 5/1992 | Szczepanek et al. | 375/118 |
| 5,231,640 | 7/1993 | Hanson et al. | 371/68.3 |

Primary Examiner—Robert W. Beausoliel, Jr.
Assistant Examiner—Stephen C. Elmore
Attorney, Agent, or Firm—Foley & Lardner

[57] ABSTRACT

A memory data copying apparatus which assures the reliability of copying processing and can operate at a high rate is disclosed. When address information and data are to be multiplexed and written into a FIFO memory, identification bits for identification between them are added to them, respectively. When no error is involved in accessing to a main storage apparatus of one of a pair of systems, the address information and the data as well as the identification bits are written into the FIFO memory, but when an error is involved, only the address information and the Identification bit for it are written into the FIFO memory while the data are not written into the FIFO memory. Accordingly, when an error occurs, a wasteful operation of writing wrong data into the FIFO memory is eliminated while address information can be taken out from the FIFO memory.

6 Claims, 5 Drawing Sheets

FIG.4

| ADDRESS/DATA | IDENTIFICATION BIT |
|---|---|
| ADDRESS 1 | 1 |
| DATA 1 | 0 |
| ADDRESS 2 | 1 |
| ADDRESS 3 | 1 |
| DATA 3 | 0 |
| ⋮ | ⋮ |

MEMORY DATA COPYING APPARATUS

This application is a continuation of application Ser. No. 08/111,405, filed Aug. 25, 1993, now abandoned.

BACKGROUND OF THE INVENTION

1. Field of the Invention

This invention relates to a memory data copying apparatus which is interposed between a pair of systems each including a central processing unit (CPU) and a main storage apparatus and is constructed to multiplex data read out from the main storage apparatus of one of the two systems with corresponding address information and successively write and read the thus multiplexed data and address information into and from a FIFO (first-in first-out) memory to copy the data into the main storage apparatus of the other system.

2. Description of the Related Art

Various memory data copying apparatus of the type mentioned are already known, and an exemplary one of such conventional memory data copying apparatus is shown in FIG. 5. Referring to FIG. 5, the copying apparatus includes an address.data multiplexing circuit 610, an error detection circuit 620, a FIFO memory 640, and an address.data demultiplexing circuit 631. The copying apparatus multiplexes, by means of a multiplexing section 650 of the address.data multiplexing circuit 610 thereof, address information and data transmitted thereto from the main storage apparatus of a first system not shown and writes the multiplexed data and address information into the FIFO memory 640 under the control of a write control section 660. In this instance, one of the following methods is used.

In particular, in the first method, it is detected by the error detection circuit 620 whether or not an error is involved in accessing to the main storage apparatus of the first system, and after presence or absence of an error is determined, the FIFO memory 640 is accessed so that, when absence of an error is determined, the address information and the data are written into the FIFO memory 640, but when presence of an error is determined, none of the address information and the data is written into the FIFO memory 640.

In the second method, the address information and the data are written once into the FIFO memory 640 irrespective of presence or absence of an error, and thereupon, if a result of detection by the error detection circuit 620 proves presence of an error, error information is added. Then, upon reading out from the FIFO memory 640, such error information is checked, and if absence of an error is determined, then the address information and the data read out from the FIFO memory 640 are demultiplexed by the address.data demultiplexing circuit 631 and copied into the main storage apparatus of the second system, but on the contrary if presence of an error is determined, then the data and the address information read out are abandoned.

With the first method, however, since the FIFO memory is accessed without fail after error detection processing is performed by the error detection circuit to check presence or absence of an error and besides, when presence of an error is determined, the FIFO memory is accessed although none of the address information and the data is to be written into the FIFO memory, a waiting time is produced before a writing operation into the FIFO memory, which reduces the processing rate of the copying apparatus, resulting in deterioration of the processing capacity of the entire system. Further, when an error occurs, since address information is not available at the destination of copying, there is a problem since processing is complicated there is trouble with the system.

On the other hand, with the second method, since address information and data are written into the FIFO memory irrespective of presence or absence of an error, when an error occurs frequently when the main storage apparatus is accessed successively, the amount of wrong and unnecessary data written in the FIFO memory increases, which deteriorates effective use of the FIFO memory. Consequently, not only the processing capacity of the FIFO memory is deteriorates, but also the FIFO memory may possibly overflow.

SUMMARY OF THE INVENTION

It is an object of the present invention to provide a memory data copying apparatus which assures the reliability of copying processing and can operate at a high rate.

In order to attain the object described above, according to the present invention, there is provided a memory data copying apparatus which is connected to a central processing unit and a main storage apparatus of a first system by way of a common bus and to another central processing unit and another main storage apparatus of a second system by way of another common bus. The apparatus is adapted to multiplex data read out from the main storage apparatus of one of the first and second systems with corresponding address information and successively write and read the thus multiplexed data and address information into and from a FIFO memory to copy the data into the main storage apparatus of the other one of the first and second systems. The apparatus comprises a first circuit set including an error detection circuit, an address.data multiplexing circuit and an address.data demultiplexing circuit all connected to the common bus of the first system. There is also a second circuit set including an error detection circuit, an address-.data multiplexing circuit and an address.data demultiplexing circuit all connected to the common bus of the second system. The error detection circuit in each of the first and second circuit sets detects an access error to the corresponding main storage apparatus which occurs on the corresponding common bus. The address.data multiplexing circuit in each of the first and second circuit multiplexes data and address information from the corresponding common bus with each other, adding, to the data and the address information, respective identification bits for identification between them. The apparatus writes the data, the address information and the identification bits into the FIFO memory when detection information from the corresponding error detection circuit represents absence of an error, but writes only the address information and the identification bit for the address information into the FIFO memory when the detection information from the corresponding error detection circuit represents presence of an error. The address.data demultiplexing circuit reads out the data, the address information and the identification bits written in the FIFO memory and demultiplexes the data and the address information in accordance with the identification bits.

In the memory data copying apparatus, in order to copy data from the main storage apparatus of the first system into the main storage apparatus of the second system, when the former main storage apparatus is accessed so that data and address information are read out onto the common bus of the first system, the address information and the data thus read out are multiplexed so that they may appear alternately and successively, and identification bits for identification between the address information and the data are added to them, respectively, by the address.data multiplexing circuit of the first circuit set. When the detection information from the error detection circuit represents absence of an error, both of the address information and the data as well as the identification bits for them are written into the FIFO memory, but when the detection information represents presence of an error, only the address information and the identification bit for it are written into the FIFO memory while the data and the identification bit for it are not written into the FIFO memory. The address information, the data and the identification bits stored in the FIFO memory are read out, and the address information and the data are demultiplexed from each other in accordance with the identification bits by the address.data demultiplexing circuit so that the data are copied into the main storage apparatus of the second system. However, when an access error has occurred in the main storage apparatus of the first system, only the address information is obtained.

Consequently, upon occurrence of an error, a wasteful operation of writing wrong data into the FIFO memory can be eliminated. However, address information can be taken out also when an error occurs. Accordingly, with the memory data copying apparatus, copying operation can be performed at a high rate while the reliability of copying processing is assured. Such similarly applies to copying from the main storage apparatus of the second system into the main storage apparatus of the first system.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a table illustrating written contents of a FIFO memory of the memory data copying apparatus of FIG. 1.

DETAILED DESCRIPTION OF THE PREFERRED EMBODIMENT

Figure 1:
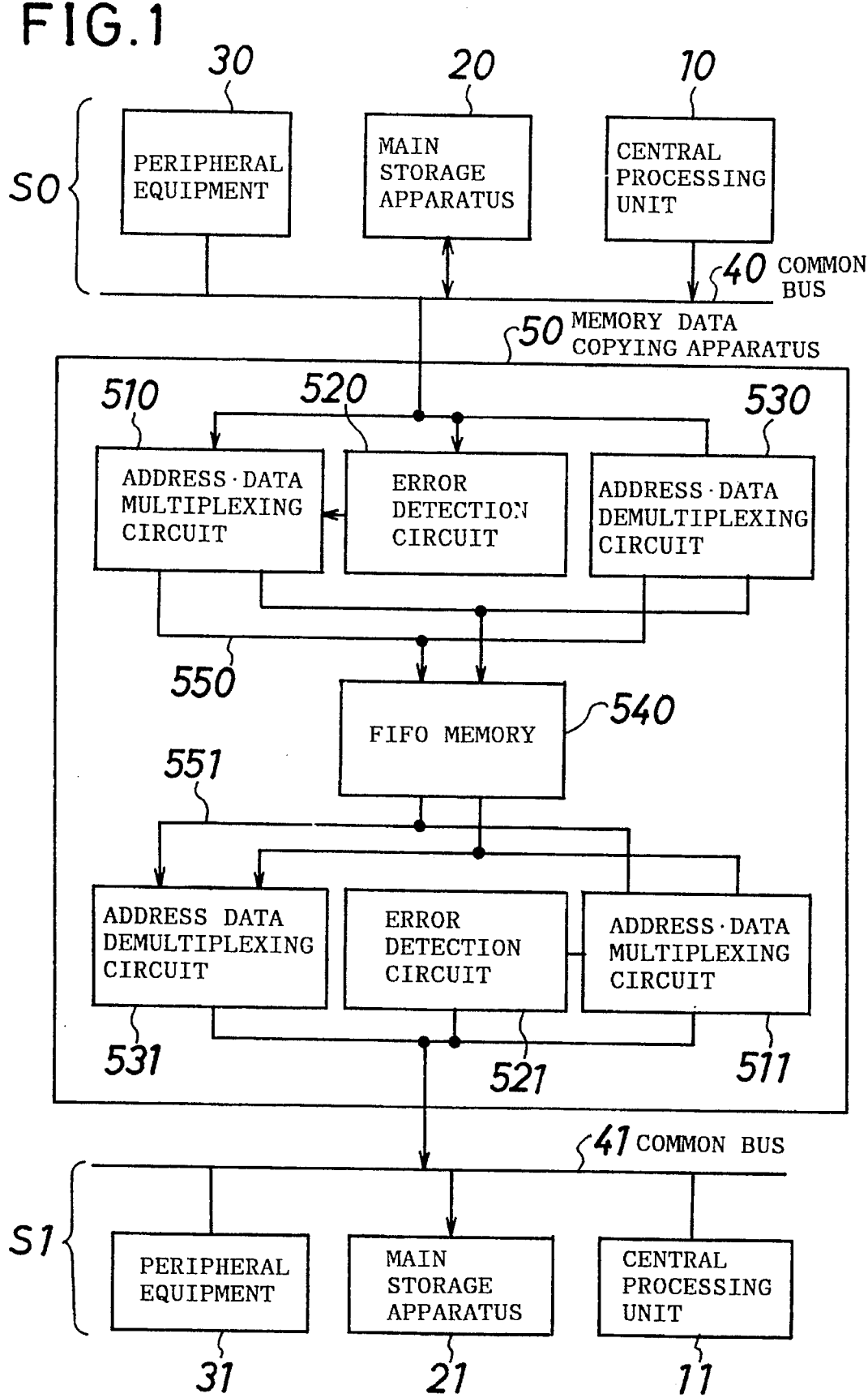
FIG. 1 is a block diagram of a memory data copying apparatus and a pair of systems connected to the memory data copying apparatus showing a preferred embodiment off the present invention.

Referring to first to FIG. 1, there are shown a memory data copying apparatus according to the present invention and a pair of systems connected to the memory data copying apparatus. The memory data copying apparatus is generally denoted at 50 and is interposed between a first system S0 and a second system S1. The first system S0 includes a central processing unit (CPU) 10, a main storage apparatus 20 and a plurality of peripheral equipment 30 (only one is shown) all connected to a common bus 40 while the second system S1 similarly includes a central processing unit 11, a main storage apparatus 21 and a plurality of peripheral equipment 31 (only one is shown) all connected to a common bus 41. The memory data copying apparatus has an input/output terminal connected to the common bus 40 of the first system S0 and another input/output terminal connected to the common bus 41 of the second system S1.

The memory data copying apparatus includes a first circuit set including an address.data multiplexing circuit 510, an error correction circuit 520 and an address.data demultiplexing circuit 530 all connected in parallel to the common bus 40 of the first system S0, a second circuit set including an address.data multiplexing circuit 511, an error detection circuit 521 and an address.data demultiplexing circuit 531 all connected similarly in parallel to the common bus 41 of the second system S1, and a single FIFO (first-in first-out) memory 540 connected between the address.data multiplexing circuits 510 and 511 and between the address-.data demultiplexing circuits 530 and 531.

The address.data multiplexing circuit 510 of the first circuit set multiplexes address information and data received from the common bus 40 of the first system S0, adds identification bits to the address information and the data, and writes resultant data into the FIFO memory 540. Similarly, the address.data multiplexing circuit 511 of the second circuit set multiplexes address information and data received from the common bus 41 of the second system S1, adds identification bits to the address information and the data, and writes resultant data into the FIFO memory 540. The error detection circuit 520 of the first circuit set detects an error in accessing to the main storage apparatus 20 which occurs on the common bus 40 of the first system S0, and similarly, the error detection circuit 521 of the second circuit set detects an error in accessing to the main storage apparatus 21 which occurs on the common bus 41 of the second system S1. The address.data demultiplexing circuit 530 of the first circuit set demultiplexes data and address information from the second system S1 written in the FIFO memory 540 from each other and read out onto the common bus 40 of the first system S0. On the other hand, the address.data demultiplexing circuit 531 of the second circuit set demultiplexes data and address information from the first system S0 written in the FIFO memory 540 from each other and read out onto the common bus 41 of the second system S1.

Figure 2:
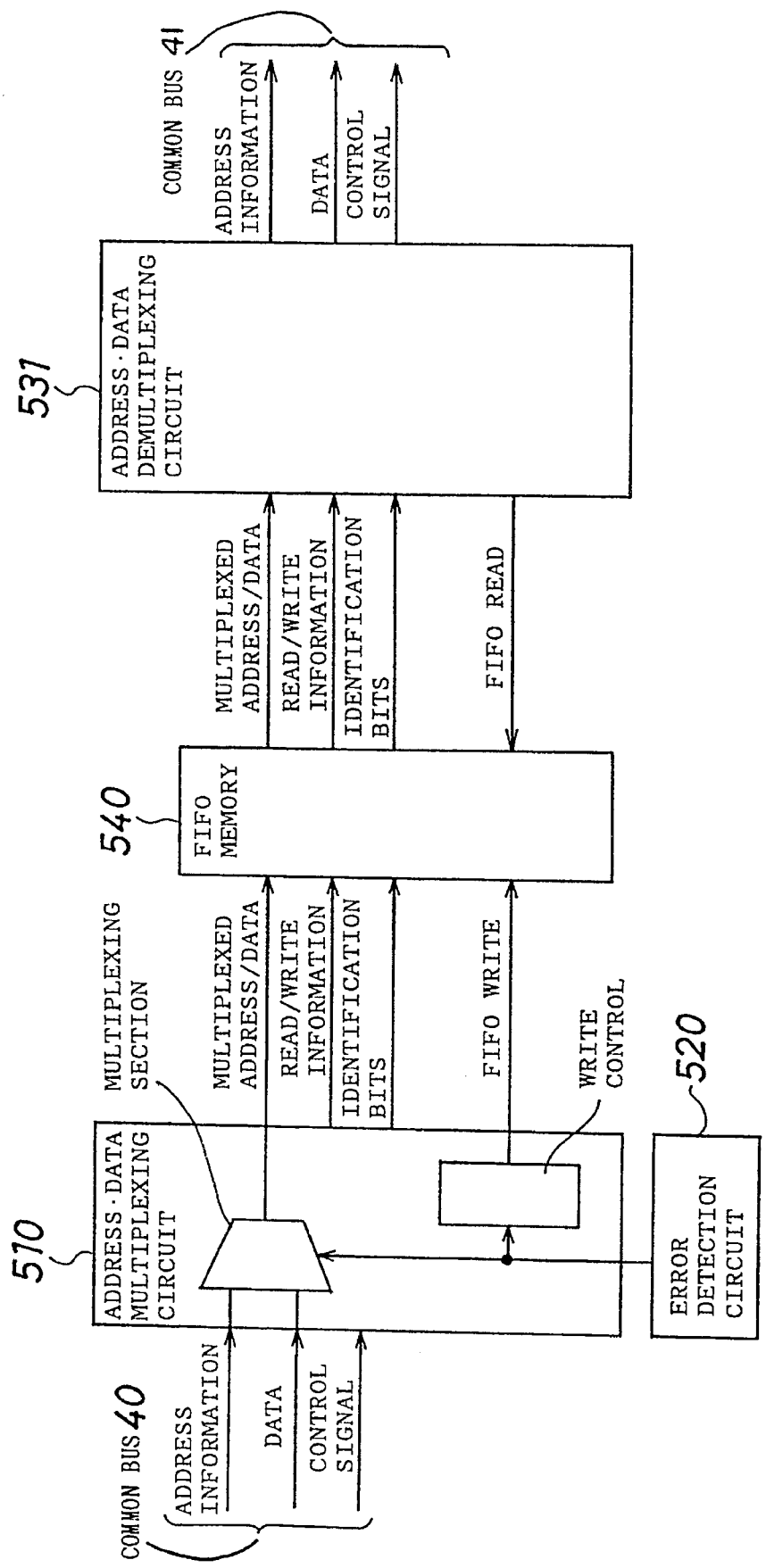
FIG. 2 is a block diagram showing a basic construction of the memory data copying apparatus shown in FIG. 1.

Subsequently, operation of the memory data copying apparatus 50 when data are to be copied from the main storage apparatus 20 of the first system S0 serving as an active system into the main storage apparatus 21 of the second system S1 serving as a stand-by system will be described with additional reference to FIGS. 2, 3 and 4.

The central processing unit 10 of the first system S0 accesses the main storage apparatus 20 in order to execute a program stored in the main storage apparatus 20. Thereupon, the copying apparatus 50 detects such memory accessing on the common bus 40 and accesses the main storage apparatus 21 of the second system S1.

Figure 3:
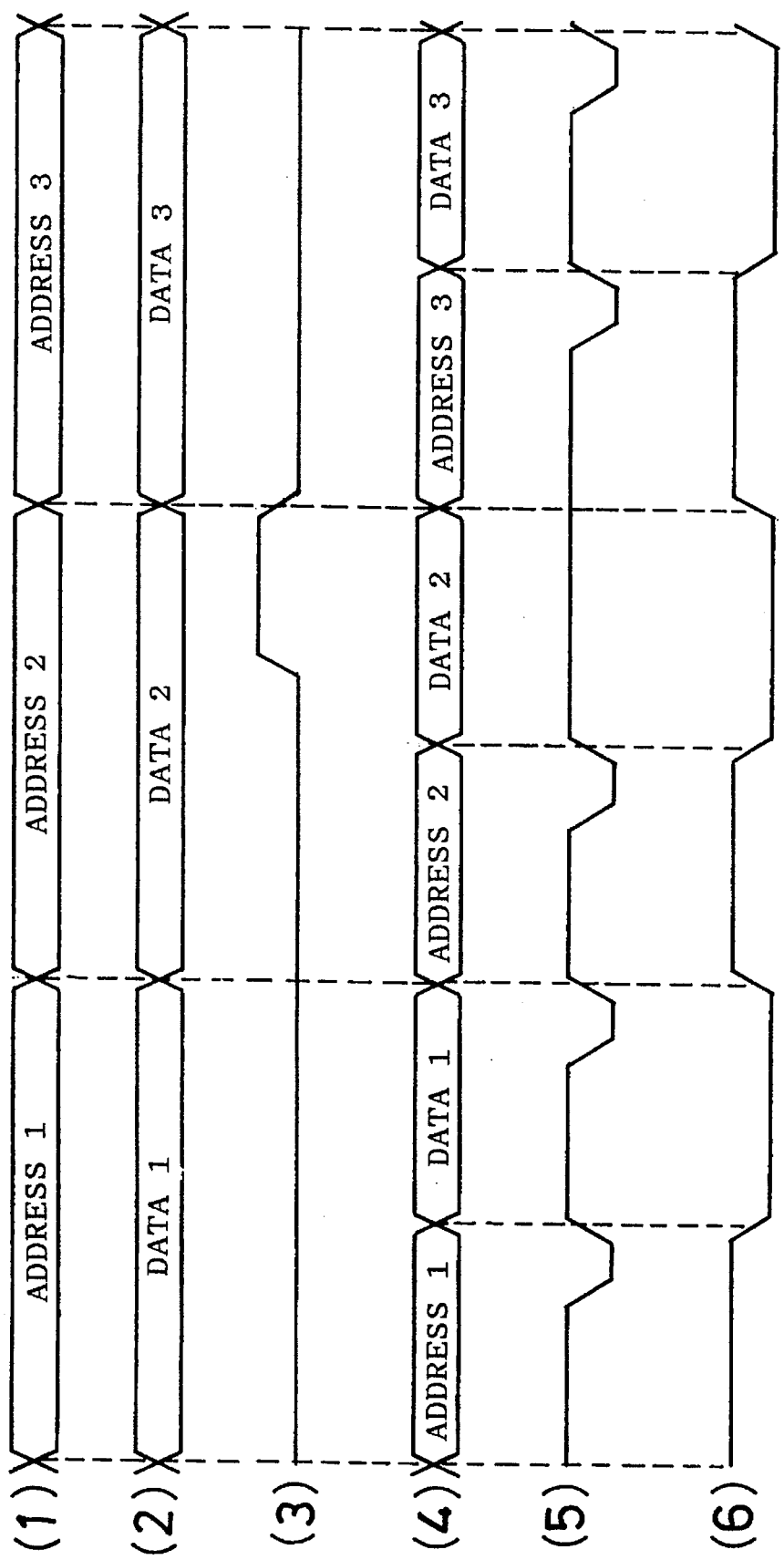
FIG. 3 is a time chart illustrating operation of the memory data copying apparatus of FIG. 1.
Figure 5:
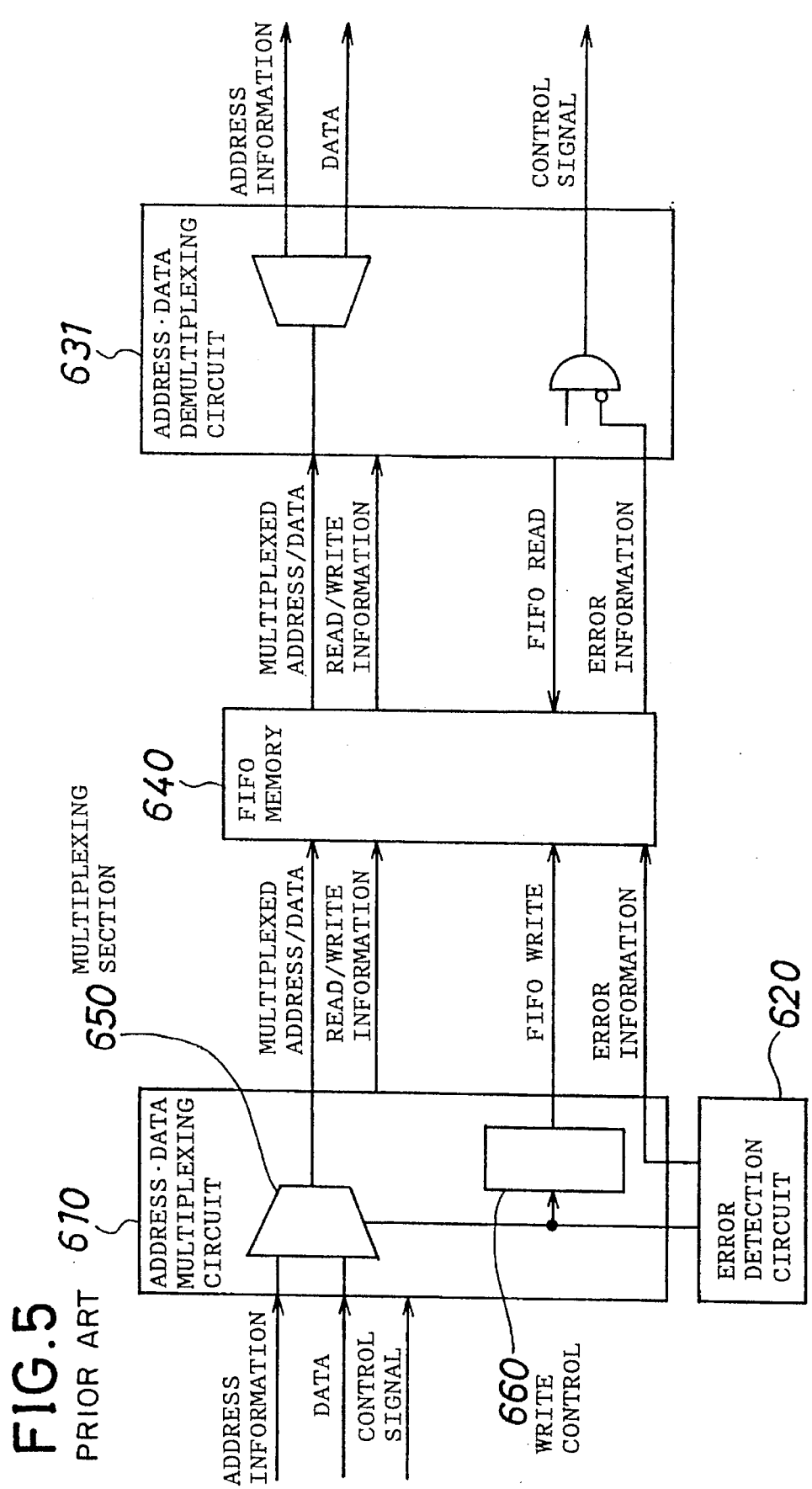
FIG. 5 is a block diagram showing a basic construction of a conventional memory data copying apparatus.

The address.data multiplexing circuit 510 of the first circuit set of the copying apparatus 50 multiplexes address information indicated by a waveform (1) of FIG. 3 and data indicated by another waveform (2) of FIG. 3, both appearing on the common bus 40, with each other so that the address information and the data may appear alternately and successively as seen from a further waveform (4) of FIG. 3, and stores the resulted data into the FIFO memory 540 while adding identification bits for identification between the address information and the data to the resulted data as seen from a still further waveform (6) of FIG. 3. In this instance, the address.data multiplexing circuit 510 provides such a writing instruction signal as seen from a yet further waveform (5) of FIG. 3 to the FIFO memory 540 under the control in accordance with such detection information from the error detection circuit 520 as seen from a yet further waveform (3) of FIG. 3. Then, when the detection information represents absence of an error, both of the address information and the data as well as the identification bits for them are written into the FIFO memory 540 (the writing instruction signal indicates writing when it has a low level), but on the contrary when the detection information represents presence of an error, only the address information and the identification bit for the address information are written into the FIFO memory 540 while the data and the identification bit for the data are not written into the FIFO memory 540. From FIG. 3, it can be seen that, upon first accessing and third accessing, since no error is detected, both of address information and data are written into the FIFO memory 540 together with identification bits for them, but upon second accessing, since an error is detected, only address information and an identification bit for it are written into the FIFO memory 540. FIG. 4 indicates contents written into the FIFO memory 540 in this instance. In this instance, the identification bit for address information is represented by "1" while the identification bit for data is represented by "0".

When it is detected that such writing into the FIFO memory 540 as described above has occurred, the address-.data demultiplexing circuit 531 delivers a reading instruction signal to the FIFO memory 540 to read out address information, data and identification bits written in the FIFO memory 540 and demultiplexes the address information and the data from each other in accordance with the identification bits. In particular, when an identification bit read out by way of a line 551 is "1", the address information is transferred to an address register (not shown) of the address.data demultiplexing circuit 531, but when the identification bit is "0", reading accessing to the FIFO memory 540 is temporarily interrupted until data are transferred to a data register (not shown) of the address.data demultiplexing circuit 531, and then after the data are transferred to the data register, the main storage apparatus 21 of the second system S1 is accessed to copy the address information in the address register and the data in the data register into the main storage apparatus 21. Then, the same operation is repeated until the contents of the FIFO memory 540 are all transferred.

On the contrary when data are to be copied from the main storage apparatus 20 of the second system S1 serving as an active system Into the main storage apparatus 20 of the first system S0 serving as a stand-by system, the address.data multiplexing circuit 511 and the error detection circuit 521 of the second circuit set, the FIFO memory 540 and the address.data demultiplexing circuit 530 of the first circuit set operate similarly to those described above to effect desired copying.

Having now fully described the invention, it will be apparent to one of ordinary skill in the art that many changes and modifications can be made thereto without departing from the spirit and scope of the invention as set forth herein.

What is claimed is:

1. A memory data copying apparatus for connection to a central processing unit and a main storage apparatus of a first system by way of a common bus and to another central processing unit and another main storage apparatus of a second system by way of another common bus, for multiplexing data read out from said main storage apparatus of one of said first and second systems with address information and successively writing and reading the multiplexed data and address information into and from a FIFO memory and copying the data into said main storage apparatus of the other one of said first and second systems, comprising:

a first circuit set including an error detection circuit, an address.data multiplexing circuit and an address.data demultiplexing circuit all connected to and corresponding to said common bus of said first system; and a second circuit set including an error detection circuit, an address.data multiplexing circuit and an address.data demultiplexing circuit all connected to and corresponding to said common bus of said second system;

wherein said error detection circuit in each of said first and second circuit sets detects an error in accessing the corresponding main storage apparatus which occurs on the corresponding common bus, and transmits detection information;

wherein said address.data multiplexing circuit in each of said first and second circuit sets;
 (1) multiplexes data and address information from the corresponding common bus;
 (2) adds to the data and the address information a respective identification bit for identification between address information and data, and
 (3) writes the data, the address information and the identification bit into said FIFO memory when detection information from the corresponding error detection circuit represents absence of an error; and
 (4) writes only the address information and the identification bit for the address information into said FIFO memory when the detection information from the corresponding error detection circuit represents presence of an error;
 (5) whereby said FIFO memory contains the data, the address information and the identification bit when there is the absence of an error, and said FIFO memory contains the address information and the identification bit and not the data when there is the presence of an error;

wherein said address.data demultiplexing circuit reads out the data, the address information and the identification bit written in said FIFO memory and demultiplexes the data and the address information based on the identification bit;

wherein, when one of said address.data demultiplexing circuits detects that one of said address.data multiplexing circuits has written into said FIFO memory, said one of said address.data demultiplexing circuits performs read accessing of the FIFO memory and reads the address information, the data and the identification bit written in said FIFO memory; and when the identification bit represents address information, the address.data demultiplexing circuit stores the address information in an address register in the address.data demultiplexing circuit; and when the identification bit represents data, the address.data demultiplexing circuit interrupts the read accessing of the FIFO memory while the address.data demultiplexing circuit stores the data into a data register in the address.data demultiplexing circuit, and then the address.data demultiplexing circuit transfers the stored data and address information from the respective registers into the main storage apparatus of the other one of said first and second systems.

2. The memory data copying apparatus of claim 1, wherein said identification bit is "1" to indicate address information, and is "0" to indicate data.

3. The memory data copying apparatus of claim 1, wherein said identification bit is "0" to indicate address information, and is "1" to indicate data.

4. A method for multiplexing data read out from a main storage apparatus of one of a first and second systems, the first system connected to a central processing unit and a main storage apparatus by way of a common bus and to another central processing unit and another main storage apparatus of the second system by way of another common bus, and for successively writing and reading the multiplexed data and address information into and from a FIFO memory and copying the data into said main storage apparatus of the other one of said first and second systems, the method comprising the steps of:

detecting, in an error detection circuit in each of a first and second circuit sets, said first and second circuit sets each including an address.data multiplexing circuit and an address.data demultiplexing circuit all connected to and corresponding to said common bus of corresponding system first and second systems, an error in accessing the corresponding main storage apparatus which occurs on the corresponding common bus, and transmitting detection information;

receiving, in said address.data multiplexing circuit, said detection information;

multiplexing, in said address.data multiplexing circuit in each of said first and second circuit sets, data and address information from the corresponding common bus;

adding, in said address.data multiplexing circuit in each of said first and second circuit sets, to the data and the address information a respective identification bit for identification between address information and data;

writing, in said address.data multiplexing circuit in each of said first and second circuit sets, the data, the address information and the identification bit into said FIFO memory when detection information from the corresponding error detection circuit represents absence of an error;

writing, in said address.data multiplexing circuit in each of said first and second circuit sets, the address information and the identification bit for the address information but not the data into said FIFO memory when the detection information from the corresponding error detection circuit represents presence of an error;

reading out, in said address.data demultiplexing circuit, the data, the address information and the identification bit written in said FIFO memory and demultiplexing the data and the address information based on the identification bit;

when one of said address.data demultiplexing circuits detects that said one of said address.data multiplexing circuits has written into said FIFO memory, reading the address information, the data and the identification bit from said FIFO memory; and when the identification bit represents address information, storing the address information in an address register in the address.data demultiplexing circuit; and when the identification bit represents data, interrupting the read accessing of the FIFO memory while storing the data into a data register in the address.data demultiplexing circuit, and then transferring the stored data and address information from the respective registers into the main storage apparatus of the other one of said first and second systems.

5. The method of claim 4, further comprising the step of setting said identification bit to "1" to indicate address information, and to "0" to indicate data.

6. The method of claim 4, further comprising the step of setting said identification bit to "0" to indicate address information, and to "1" to indicate data.

* * * * *